UNITED STATES PATENT OFFICE.

HANS FOERSTERLING, OF PERTH AMBOY, NEW JERSEY, ASSIGNOR TO ROESSLER & HASSLACHER CHEMICAL COMPANY, OF NEW YORK, N. Y., A CORPORATION OF NEW YORK.

COMPOSITION OF MATTER TO BE USED IN EXTRACTING PRECIOUS METALS FROM THEIR ORES.

999,215. Specification of Letters Patent. Patented Aug. 1, 1911.

No Drawing. Application filed September 21, 1909. Serial No. 518,735.

*To all whom it may concern:*

Be it known that I, HANS FOERSTERLING, a subject of the Emperor of Germany, residing at Perth Amboy, county of Middlesex, State of New Jersey, have invented a new and useful Composition of Matter to be Used in Extracting Precious Metals from Their Ores, of which the following is a specification.

My invention relates to a composition of matter which will easily generate halogen cyanids in connection with an oxidizing agent.

The object of the invention is the production of halogen cyanids in a form more suitable for use than heretofore and a new and much simpler method of manufacture.

It has been found advantageous, in practicing the well known cyanid process in the treatment of certain ores, to add some means of oxidation, as for instance air, barium peroxid, persulfates, ozone, etc. It has further been found that halogen cyanids give a very good and quick extraction of the precious metals from complex ores like tellurids. The so-called Diehl process, which makes use of bromo cyanid, is extensively practiced in Australia with good results, but as bromo cyanid is extremely poisonous and very volatile it has heretofore been prepared only just before it is used and can be produced only by the exercise of the greatest skill and care.

The usual practice heretofore, in making bromo cyanid, has been to mix sulfuric acid in a tank with water and allow the solution to cool. Cyanid is then dissolved in another tank and the cyanid solution added to the cooled diluted sulfuric acid. At the same time a mixture of an alkali bromid and bromate is added under stirring. The reaction takes place according to the following equation:

$$(2KBr + KBrO_3 + 3KCy + 3H_2SO_4 = 3BrCy + 3K_2SO_4 + 3H_2O)$$

It is obvious that the manufacture of bromo cyanid as heretofore practiced for this purpose is not simple and that great care must be taken in order to obtain good results. If the mixture of the alkali bromid and bromate is not the correct one, bromin is wasted.

By my new method I have produced a new and very much simpler means of manufacture together with a new composition of matter.

In the following I have described one means of practicing my new method and producing my new composition of matter: I melt an alkali halogen, for instance sodium bromid with an alkali cyanid, for instance sodium cyanid, in the proportion of one molecule of sodium bromid to one molecule of sodium cyanid and permit the same to solidify. I have discovered that no decomposition takes place during this process. This double salt of sodium bromid and sodium cyanid is used instead of the mixture heretofore used consisting of sulfuric acid, sodium bromid, sodium bromate and cyanid. In order to convert this double salt of sodium bromid and sodium cyanid into bromo cyanid I add an oxidizing agent, for instance an acid solution of hydrogen peroxid, the reaction taking place according to the following equation:

$$(NaBr + NaCy + H_2O_2 + H_2SO_4 = BrCy + Na_2SO_4 + 2H_2O)$$

If an acid solution was not used sodium hydrate would be formed which would destroy the bromo cyanid according to the following equation:

$$(BrCy + 2NaOH = NaBr + NaCyO + H_2O)$$

The rapidity of the formation of bromo cyanid according to the above formula depends somewhat on the concentration of the solution. I have found that if I pour a 25% volume hydrogen peroxid solution, to which the required amount of sulfuric acid has been added, over the double salt of sodium cyanid and sodium bromid the formation of bromo cyanid is so rapid that I have to cool the mixture. Bromin is seen to evolve and is at once taken up by the hydrocyanic acid. The bromo cyanid is boiling, but it can be easily condensed by proper cooling. If I dissolve 15 grams of sodium cyanid plus sodium bromid in 150 ccm. water and add to this solution 150 ccm. of water containing 3.4 grams hydrogen peroxid and 10 grams sulfuric acid the reaction takes place without necessitating cooling. If I use the same amounts of sodium cyanid plus sodium bromid and hydrogen peroxid plus sulfuric acid in 2000 ccm. of water apparently no reaction takes place, but by leaving the solution standing the bromo cyanid can be easily detected after a while by its characteristic smell. I have found that the formation of chlorin cyanid and iodin cyanid, according to the same formula, is more rapid than the formation of bromo cyanid.

Instead of using an acid solution of hydrogen peroxid, an alkali peroxid can be dissolved in an excess of an acid, or any other oxidizing agent can be used which will convert the cyanid double salt into halogen cyanid.

By the practice of my invention the mines receive the ready made correctly proportioned mixture of alkali halogen with the cyanid, all that is necessary being to dissolve a certain amount of the double salt and add an oxidizing agent.

In order to dissolve gold by the use of bromo cyanid, 3 parts of alkali cyanid should be added to 1 part of bromo cyanid, according to the following equation:

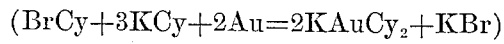

I can add sufficient cyanid at the beginning to the alkali halogen so that I obtain a mixture equivalent to the sum of the two equations:

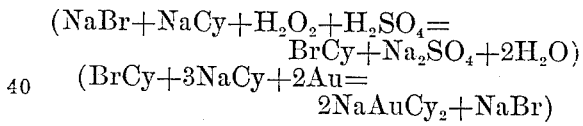

Furthermore, the largest part of the alkali halogen is not lost in practical mill work, and I therefore have to add only so much alkali halogen to the cyanid as is actually lost.

As an oxidizing agent I prefer to use an acid hydrogen peroxid solution, as it can be easily made by dissolving sodium peroxid in an excess of an acid. Such acid solutions of hydrogen peroxid, as is well known, are very stable.

It must be understood that I do not limit myself to the use of a mixture of sodium bromid and sodium cyanid and the use of hydrogen peroxid as an oxidizing agent. Instead of an alkali bromid another alkali halogen can be used which is able to form a halogen cyanid, as for instance alkali iodid. Instead of a mixture of an alkali halogen and alkali cyanid melted together and solidified I can use a double salt obtained by evaporating a solution of an alkali halogen and an alkali cyanid; instead of using an acid solution of hydrogen peroxid I can use any other oxidizing agent; instead of using sodium as the alkali I can use any other suitable alkali such as potassium.

What I claim and desire to secure by Letters Patent is:

1. A composition of matter comprising a homogeneous mixture of an alkali cyanid with an alkali halogen, the halogen having a higher atomic weight than chlorin.

2. A composition of matter comprising a mixture of an alkali cyanid with an alkali halogen melted together and solidified, the halogen having a higher atomic weight than chlorin.

3. A composition of matter comprising a homogeneous mixture of sodium cyanid with sodium bromid.

4. A composition of matter comprising a mixture of sodium cyanid with sodium bromid melted together and solidified.

5. A composition of matter comprising a homogeneous mixture of an alkali cyanid with sodium bromid.

6. A composition of matter comprising a mixture of an alkali cyanid with sodium bromid melted together and solidified.

7. A composition of matter comprising a homogeneous mixture of sodium cyanid with an alkali halogen, the halogen having a higher atomic weight than chlorin.

8. A composition of matter comprising a mixture of sodium cyanid with an alkali halogen melted together and solidified, the halogen having a higher atomic weight than chlorin.

9. A composition of matter comprising a homogeneous mixture in equal molecular proportions of an alkali cyanid with an alkali halogen, the halogen having a higher atomic weight than chlorin.

10. A composition of matter comprising a homogeneous mixture in equal molecular proportions of sodium cyanid and sodium bromid.

11. A composition of matter comprising a homogeneous mixture in equal molecular proportions of alkali cyanid and sodium bromid.

12. A composition of matter comprising a homogeneous mixture in equal molecular proportions of sodium cyanid and an alkali halogen, the halogen having a higher atomic weight than chlorin.

13. A composition of matter comprising a mixture in equal molecular proportions of an alkali cyanid with an alkali halogen melted together and solidified, the halogen having a higher atomic weight than chlorin.

14. A composition of matter comprising a mixture in equal molecular proportions of sodium cyanid and sodium bromid melted together and solidified.

15. A composition of matter comprising a mixture in equal molecular proportions of an alkali cyanid and sodium bromid melted together and solidified.

16. A composition of matter comprising a mixture in equal molecular proportions of sodium cyanid and an alkali halogen, melted together and solidified, the halogen having a higher atomic weight than chlorin.

In testimony whereof I have signed this specification in the presence of two subscribing witnesses.

HANS FOERSTERLING.

Witnesses:
FRITZ HOYLER,
HERBERT PHILIPP.

Copies of this patent may be obtained for five cents each, by addressing the "Commissioner of Patents, Washington, D. C."